US012519251B2

(12) United States Patent
Chao

(10) Patent No.: US 12,519,251 B2
(45) Date of Patent: Jan. 6, 2026

(54) DUAL POLARIZATION DIPOLE ANTENNA

(71) Applicant: Emplus Technologies, Inc., Taipei (TW)

(72) Inventor: Shih-Ying Chao, Taipei (TW)

(73) Assignee: Emplus Technologies, Inc., Tapiei (TW)

( * ) Notice: Subject to any disclaimer, the term of this patent is extended or adjusted under 35 U.S.C. 154(b) by 107 days.

(21) Appl. No.: 18/307,011

(22) Filed: Apr. 26, 2023

(65) Prior Publication Data

US 2023/0352851 A1 Nov. 2, 2023

(30) Foreign Application Priority Data

Apr. 27, 2022 (TW) ................................. 111116093
Apr. 27, 2022 (TW) ................................. 111116094

(51) Int. Cl.
*H01Q 21/26* (2006.01)
*H01Q 9/16* (2006.01)

(52) U.S. Cl.
CPC ............... *H01Q 21/26* (2013.01); *H01Q 9/16* (2013.01)

(58) Field of Classification Search
CPC .......... H01Q 21/26; H01Q 9/16; H01Q 5/371; H01Q 9/285
See application file for complete search history.

(56) References Cited

U.S. PATENT DOCUMENTS

2018/0034165 A1 2/2018 Aleksandrovich et al.

FOREIGN PATENT DOCUMENTS

| | | | | |
|---|---|---|---|---|
| CN | 204011698 | U | | 12/2014 |
| CN | 105206911 | A | | 12/2015 |
| CN | 105896071 | A | | 8/2016 |
| CN | 108511923 | A | | 9/2018 |
| CN | 113794043 | A | | 12/2021 |
| KR | 101627282 | B1 | * | 6/2016 |
| TW | 342992 | U | | 10/1998 |
| TW | M354193 | U | | 4/2009 |
| TW | M581303 | U | | 7/2019 |

* cited by examiner

*Primary Examiner* — Dieu Hien T Duong
(74) *Attorney, Agent, or Firm* — Hawkinson Yang LLP

(57) ABSTRACT

A dual polarization antenna device includes a first input terminal, a first arc wire, a second arc wire, a third arc wire, and a fourth arc wire. A first terminal of the first arc wire transmits and receives an output data signal along a first direction. A second terminal of the second arc wire transmits and receives the output data signal along a second direction. The first input terminal forms a first tangent line along the first arc wire, the first input terminal forms a second tangent line along the second arc wire, and the first tangent line and the second tangent line intersect each other at an angle. A third terminal of the third arc wire transmits and receives the output data signal along a third direction. A fourth terminal of the fourth arc wire transmits and receives the output data signal along a fourth direction.

20 Claims, 9 Drawing Sheets

DUAL POLARIZATION DIPOLE ANTENNA

CROSS-REFERENCE TO RELATED APPLICATION

This application claims priority to Taiwan Application Serial Number 111116093, filed Apr. 27, 2022, which is herein incorporated by reference in its entirety, and claims priority to Taiwan Application Serial Number 111116094, filed Apr. 27, 2022, which is herein incorporated by reference in its entirety.

BACKGROUND

Field of Invention

The present invention relates to an antenna device. More particularly, the present invention relates to a dual polarization antenna device.

Description of Related Art

The single-polarized antennas used today often have the problem of insufficient polarization coverage. Vertically polarized zero-coverage areas are prone to occur, and limits the area where the signal can be received.

SUMMARY

The present disclosure provides a dual polarization antenna device. The dual polarization antenna device includes a first input terminal, a first arc wire, a second arc wire, a third arc wire, and a fourth arc wire. The first input terminal is configured to receive an input data signal. The first arc wire is located at a front of a substrate and coupled to the first input terminal. A first terminal of the first arc wire transmits and receives an output data signal along a first direction. The second arc wire is located at the front of the substrate and coupled to the first input terminal. A second terminal of the second arc wire transmits and receives the output data signal along a second direction. The first input terminal forms a first tangent line along the first arc wire, the first input terminal forms a second tangent line along the second arc wire, and the first tangent line and the second tangent line intersect each other at an angle. The third arc wire is located at a rear of the substrate and coupled to the first input terminal. A third terminal of the third arc wire transmits and receives the output data signal along a third direction. The fourth arc wire is located at the rear of the substrate and coupled to the first input terminal. A fourth terminal of the fourth arc wire transmits and receives the output data signal along a fourth direction. The first input terminal forms a third tangent line along the third arc wire, the first input terminal forms a fourth tangent line along the fourth arc wire, and the third tangent line and the fourth tangent line intersect each other at the angle. The first direction is parallel to the third direction, the second direction is parallel to the fourth direction, and the first direction is perpendicular to the second direction.

The present disclosure provides a dual polarization antenna device. The dual polarization antenna device includes an input terminal, a first antenna, and a second antenna. The first antenna includes a first sub antenna, a second sub antenna, a fifth sub antenna and a sixth sub antenna. The second antenna includes a third sub antenna, a fourth sub antenna, a seventh sub antenna and an eighth sub antenna. The input terminal is configured to receive a first input signal and/or a second input signal. The first sub antenna is located at a front of a substrate and coupled to the input terminal. A first terminal of the first sub antenna transmits and receives a first output signal along a first direction according to the first input signal. The second sub antenna is located at the front of the substrate and coupled to the input terminal. A second terminal of the second sub antenna transmits and receives the first output signal along a second direction according to the first input signal. The third sub antenna is located at the front of the substrate and coupled to the input terminal. A third terminal of the third sub antenna transmits and receives a second output signal along a third direction according to the second input signal. The fourth sub antenna is located at the front of the substrate and coupled to the input terminal. A fourth terminal of the fourth sub antenna transmits and receives the second output signal along a fourth direction according to the second input signal. The first direction is perpendicular to the second direction, and the third direction is perpendicular to the fourth direction. The fifth sub antenna is located at a rear of the substrate and coupled to the input terminal. A fifth terminal of the fifth sub antenna transmits and receives the first output signal along a fifth direction according to the first input signal. The sixth sub antenna is located at the rear of the substrate and coupled to the input terminal. A sixth terminal of the sixth sub antenna transmits and receives the first output signal along a sixth direction according to the first input signal. The seventh sub antenna is located at the rear of the substrate and coupled to the input terminal. A seventh terminal of the seventh sub antenna transmits and receives the second output signal along a seventh direction according to the second input signal. The eighth sub antenna is located at the rear of the substrate and coupled to the input terminal. The eighth sub antenna is located at the rear of the substrate and coupled to the input terminal. An eighth sub terminal of the eighth antenna transmits and receives the second output signal according to the second input signal. The fifth direction is parallel to the first direction and the sixth direction is parallel to the second direction. The seventh direction is parallel to the third direction, and the eighth direction is parallel to the fourth direction.

Therefore, based on the technical content of the present disclosure, the dual polarization antenna device shown in the embodiment of the present disclosure can use the technology of dual polarization transmit and receive signals to improve the effectiveness of the signal transmit and receive area.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
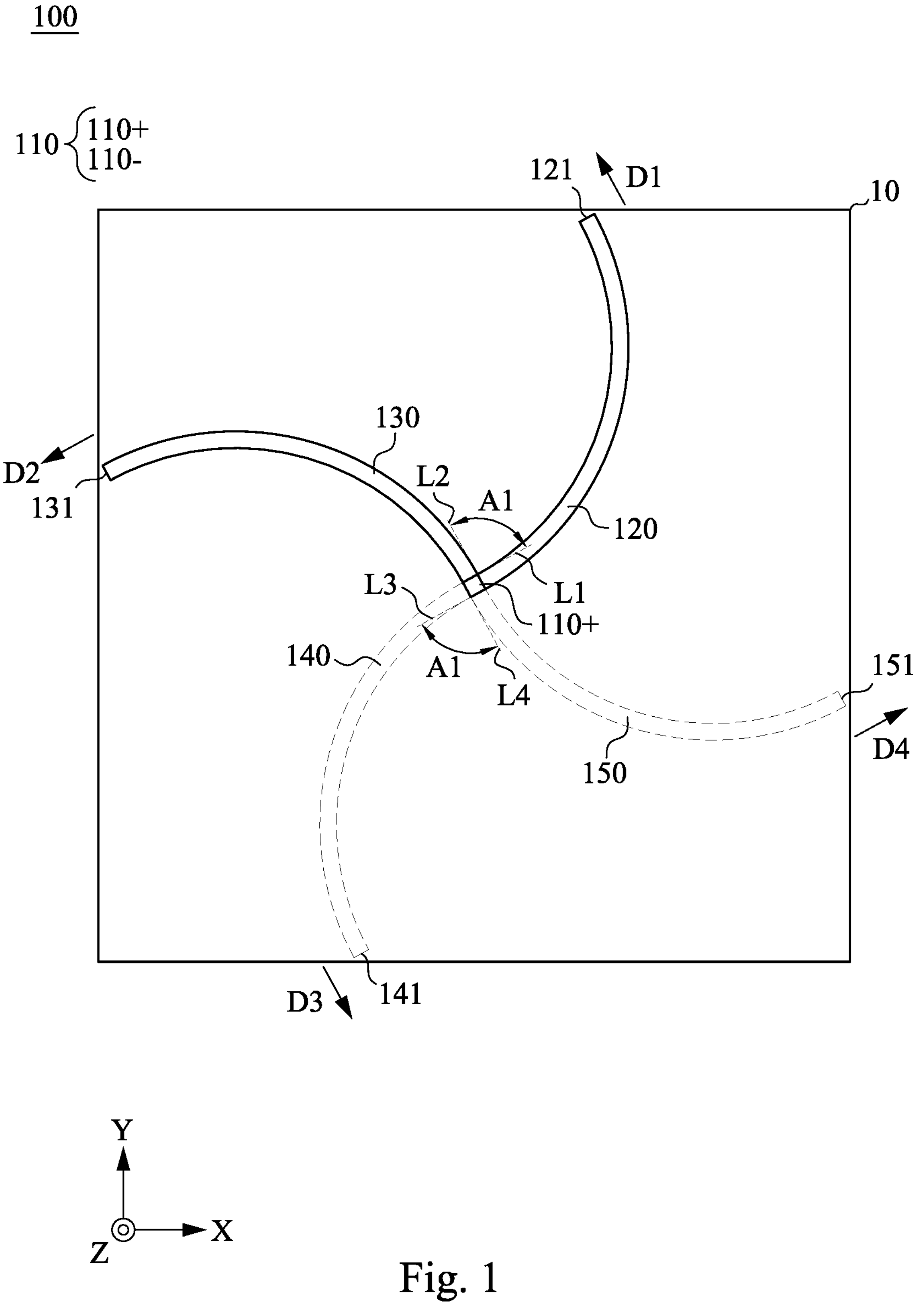
FIG. 1 is a structural diagram of a front of a dual polarization antenna device according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Various embodiments of the present technology are discussed in detail below with figures. It should be understood that the details should not limit the present disclosure. In other words, in some embodiments of the present disclosure, the details are not necessary. In addition, for simplification of figures, some known and commonly used structures and elements are illustrated simply in figures.

In the present disclosure, "connected" or "coupled" may refer to "electrically connected" or "electrically coupled." "Connected" or "coupled" may also refer to operations or actions between two or more elements.

FIG. 1 is a structural diagram of a front of a dual polarization antenna device according to an embodiment of the present disclosure. As shown in the figure, the dual polarization antenna device 100 includes a first input terminal 110, a first arc wire 120, a second arc wire 130, a third arc wire 140, and a fourth arc wire 150. In positional relationship, the first arc wire 120 and the second arc wire 130 are located at a front of the substrate 10, the third arc wire 140 and the fourth arc wire 150 are located at a rear of the substrate 10. In connection relationship, the first arc wire 120 is coupled to the first input terminal 110, the second arc wire 130 is coupled to the first input terminal 110, the third arc wire 140 is coupled to the first input terminal 110, and the fourth arc wire 150 is coupled to the first input terminal 110. In some embodiments, the first input terminal 110 can include an input terminal 110+ and an input terminal 110−, where in connection relationship, the first arc wire 120 is coupled to the input terminal 110+, the second arc wire 130 is coupled to the input terminal 110+, the third arc wire 140 is coupled to the input terminal 110−, and the fourth arc wire 150 is coupled to the input terminal 110−, but the present disclosure is not limited to such embodiments.

In order to use the technology of dual polarization transmit and receive signals to improve the effectiveness of the signal transmit and receive area, the present disclosure provides the dual polarization antenna device 100 in FIG. 1, and the detailed operations of the dual polarization antenna device 100 is as shown below.

Figure 2:
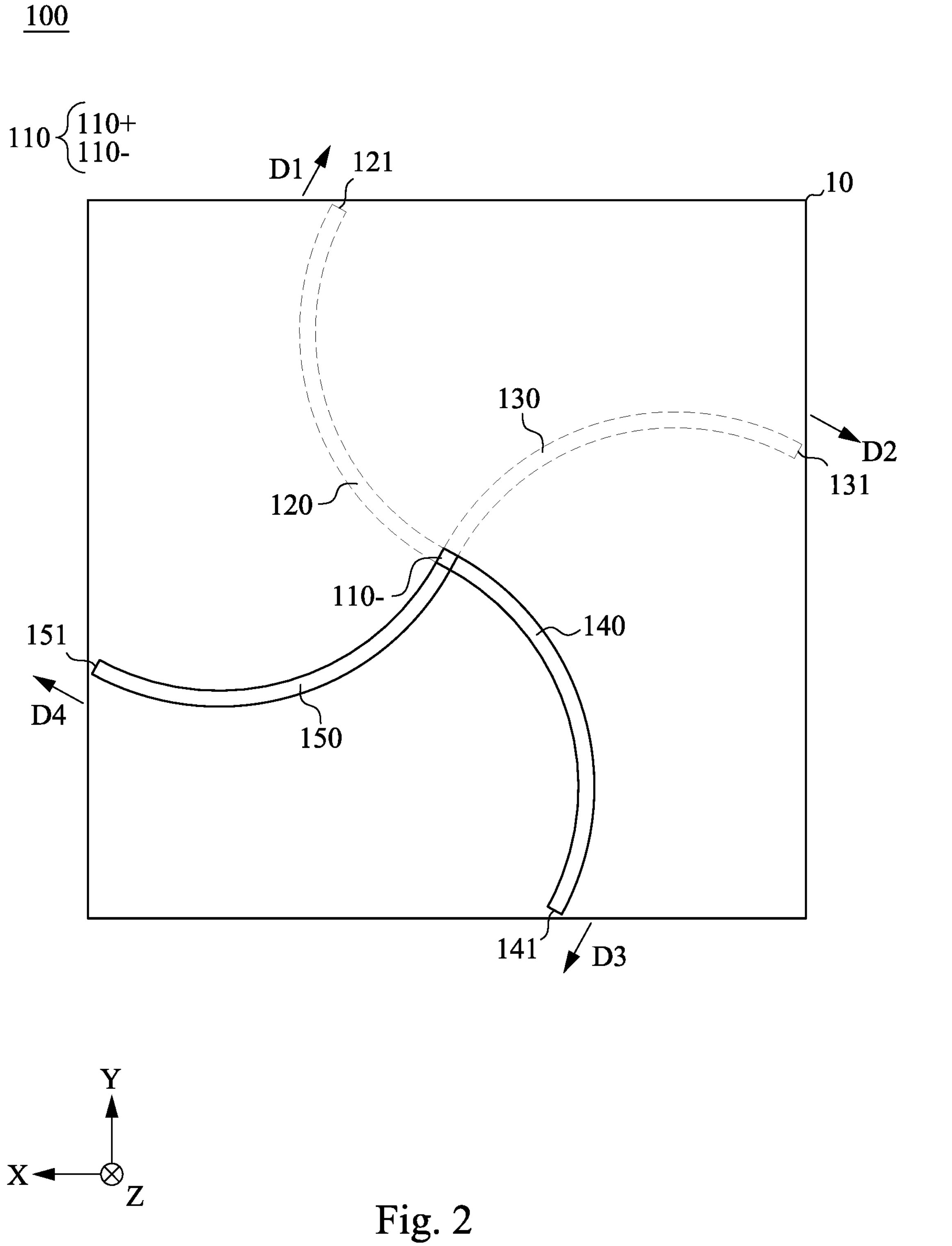
FIG. 2 is a structural diagram of a rear of a dual polarization antenna device according to an embodiment of the present disclosure.

FIG. 2 is a structural diagram of a rear of a dual polarization antenna device according to one embodiment of the present disclosure. Referring to FIG. 1 and FIG. 2, the first input terminal 110 (such as the input terminal 110+, 110−) is configured to receive an input data signal. A first terminal 121 of the first arc wire 120 transmits and receives an output data signal along a first direction D1. For example, an input data signal can have a corresponding relationship with the output data signal, the input signal can be converted into an output data signal through the first arc wire 120, and the first terminal 121 of the first arc wire 120 transmits this output data signal along the first direction D1. Moreover, the first terminal 121 of the first arc wire 120 can receive the output data signal along the first direction D1, and this output data signal can be converted into the input data signal through the first arc wire 120, but the present disclosure is not limited to the embodiment.

Then, a second terminal 131 of the second arc wire 130 transmits and receives the output data signal along a second direction D2, wherein the first input terminal 110 (such as the input terminal 110+) forms a first tangent line L1 along the first arc wire 120, the first input terminal 110 (such as the input terminal 110+) forms a second tangent line L2 along the second arc wire 130, and the first tangent line L1 and the second tangent line L2 intersect each other at an angle A1. A third terminal 141 of the third arc wire 140 transmits and receives the output data signal along a third direction D3. A fourth terminal 151 of the fourth arc wire 150 transmits and receives the output data signal along a fourth direction D4, wherein the first input terminal 110 (such as the input terminal 110−) forms a third tangent line L3 along the third arc wire 140, the first input terminal 110 (such as the input terminal 110−) forms a fourth tangent line L4 along the fourth arc wire 150, and the third tangent line L3 and the fourth tangent line L4 intersect each other at the angle A1, wherein the first direction D1 is parallel to the third direction D3, the second direction D2 is parallel to the fourth direction D4, and the first direction D1 is perpendicular to the second direction D2.

For example, a conversion relationship between the input signal and the output data signal through the second arc wire 130, third arc wire 140, or fourth arc wire 150 can be similar to the conversion relationship between the input signal and the output data signal through the first arc wire 120, and so will be omitted herein for the sake of brevity. Moreover, the first tangent line L1 and the second tangent line L2 can intersect each other at the angle A1, the third tangent line L3 and the fourth tangent line L4 can intersect each other at the angle A1, and the angle A1 can be 90 degrees. The main purpose is to ensure that the polarization directions of the output data signal sent by the first arc wire 120, second arc wire 130, third arc wire 140, and fourth arc wire 150 are vertical or horizontal to each other, so as to improve the transmit and receive area of the output data signal, but the present disclosure is not limited to such embodiment.

Additionally, the first direction D1 can be parallel to the third direction D3, the second direction D2 can be parallel to the fourth direction D4, and the first direction D1 can be perpendicular to the second direction D2. The first direction D1, the second direction D2, the third direction D3, and the fourth direction D4 can all be parallel to the substrate 10.

In an embodiment, a shape of the first arc wire 120, a shape of the second arc wire 130, a shape of the third arc wire 140, and a shape of the fourth arc wire 150 are the same. For example, the first arc wire 120, the second arc wire 130, the third arc wire 140, and the fourth arc wire 150 can have the same appearance or shape as each other, and the shape can generally be a one-dimensional, a two-dimensional, or a three-dimensional shape, but the present disclosure is not limited to such embodiment.

In an embodiment, the shape of the first arc wire 120, the shape of the second arc wire 130, the shape of the third arc wire 140, and the shape of the fourth arc wire 150 each include a quarter arc wire of a round. For example, the round can be a shape that follows an arc length equal to $2\pi r$, the round can be divided into four quarter arc wires, and one of the four quarter arc wires can be used as the first arc wire 120, the second arc wire 130, the third arc wire 140, or the fourth arc wire 150. In other words, the first arc wire 120 can be the quarter arc wire, the second arc wire 130 can be the quarter arc wire, the third arc wire 140 can be the quarter arc wire, and the fourth arc wire 150 can be the quarter arc wire, but the present disclosure is not limited to such embodiment.

In one embodiment, a first length of the first arc wire 120, a second length of the second arc wire 130, a third length of the third arc wire 140, and a fourth length of the fourth arc wire 150 are identical to each other. For example, an arc length of the first arc wire 120 can be 3.1 cm (centimeter), and an arc length of the second arc wire 130, an arc length of the third arc wire 140, and an arc length of the fourth arc wire 150 can all be 3.1 cm, but the present disclosure is not limited to such embodiment.

In one embodiment, the first length of the first arc wire 120, the second length of the second arc wire 130, the third length of the third arc wire 140, and the fourth length of the fourth arc wire 150 each comprises a quarter wavelength length of the output data signal. For example, the first length, the second length, the third length, and the fourth length can be equal, and follow the following formula:

$$cl = \frac{1}{4}\lambda. \quad \text{formula 1}$$

$$\lambda = \frac{c}{f}. \quad \text{formula 2}$$

In the above formula 1, cl is the arc length (in centimeters, cm), and λ is a wavelength (in centimeters, cm). In the above formula 2, λ is the wavelength (in centimeters, cm), c is a speed of light (in meters per second, m/s), f is a frequency (in Hertz, Hz).

A Table 1 can be obtained according to the above formula 1 and formula 2, as shown below.

TABLE 1

| | 2G antenna | 5G antenna | 2.4G antenna |
|---|---|---|---|
| the speed of light (m/s) | $3 \times 10^8$ | $3 \times 10^8$ | $3 \times 10^8$ |
| the frequency (Hz) | $2 \times 10^9$ | $5 \times 10^9$ | $2.4 \times 10^9$ |
| the wavelength (cm) | 15 | 6 | 12.5 |
| the arc length (cm) | 3.75 | 1.5 | 3.125 |

The arc length shown in the Table 1 can be the first length of the first arc wire 120, the second length of the second arc wire 130, the third length of the third arc wire 140, or the fourth length the fourth arc wire 150, and the arc length can be 3.75, 1.5 or 3.125 cm, but the present disclosure is not limited to such embodiment.

In one embodiment, the angle A1 includes a 90 degree angle. For example, the angle A1 can be 70, 80, or 90 degrees, but the present disclosure is not limited to the embodiment. In some embodiments, the angle A1 (that is, a best implementation angle) in the present disclosure can be 90 degrees, but the present disclosure is not limited to such embodiment.

Figure 3:
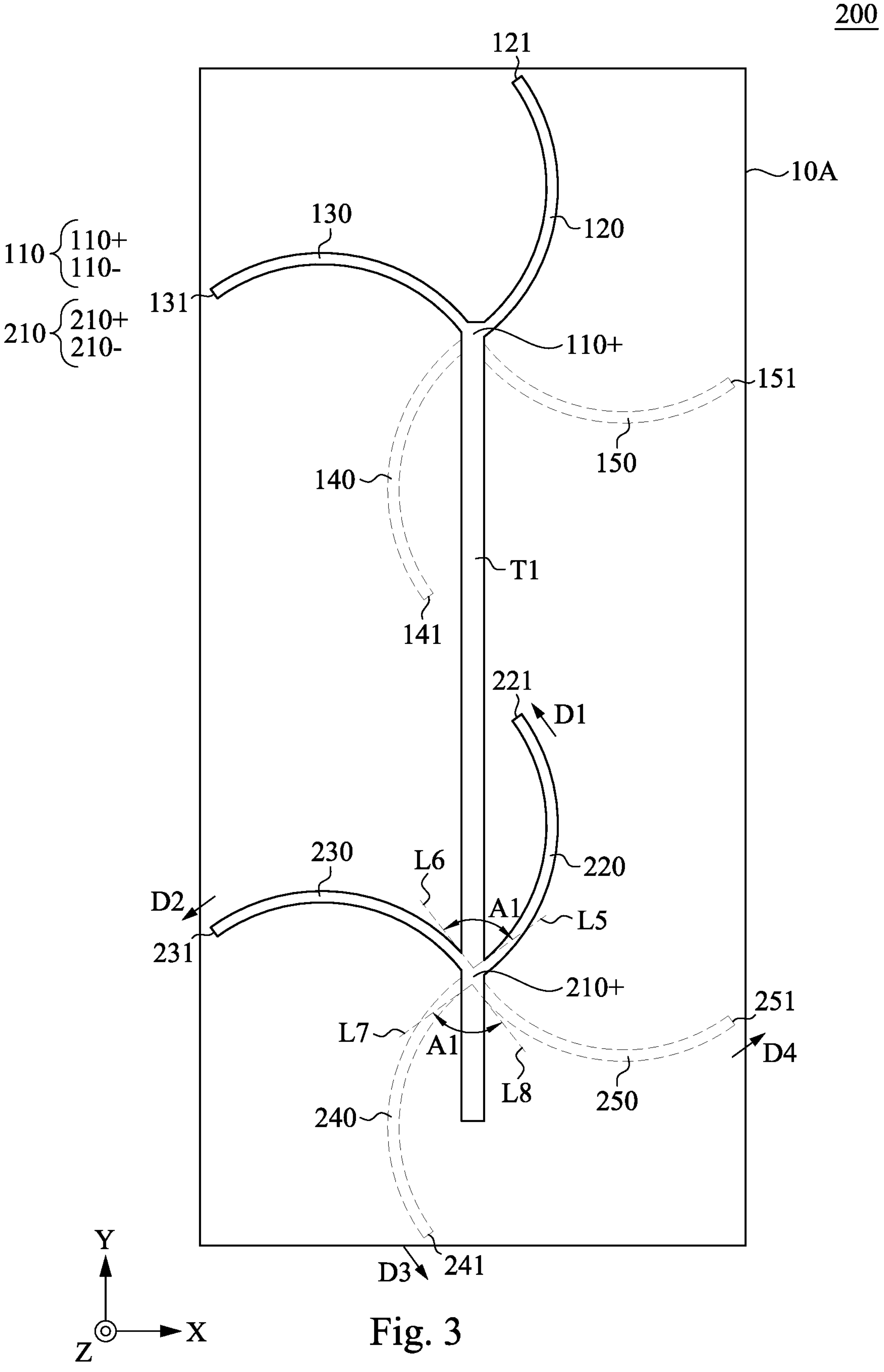
FIG. 3 is a structural diagram of a plurality of dual polarization antenna devices according to an embodiment of the present disclosure.
Figure 4:
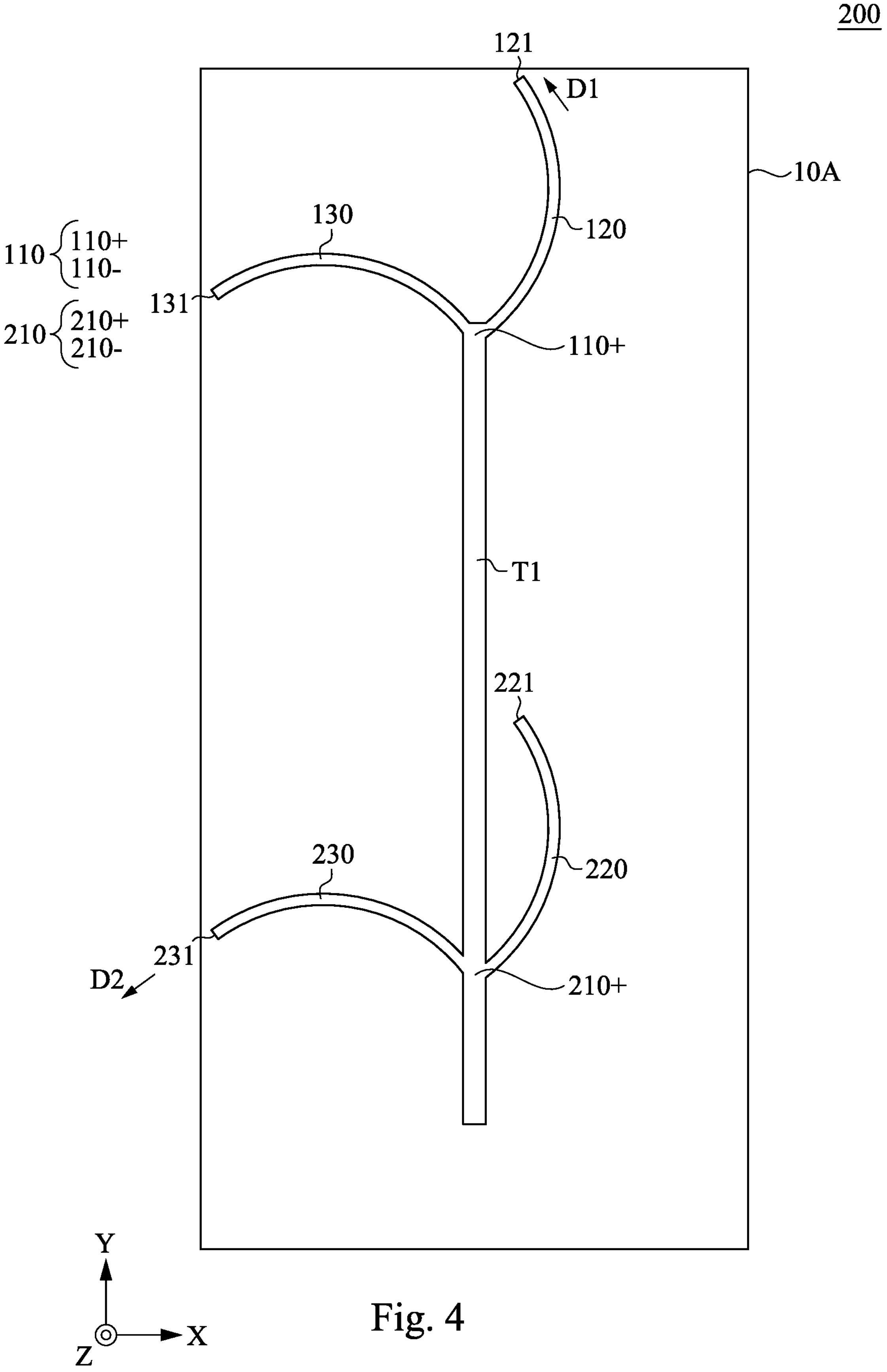
FIG. 4 is a structural diagram of a front of a plurality of dual polarization antenna devices according to an embodiment of the present disclosure.
Figure 5:
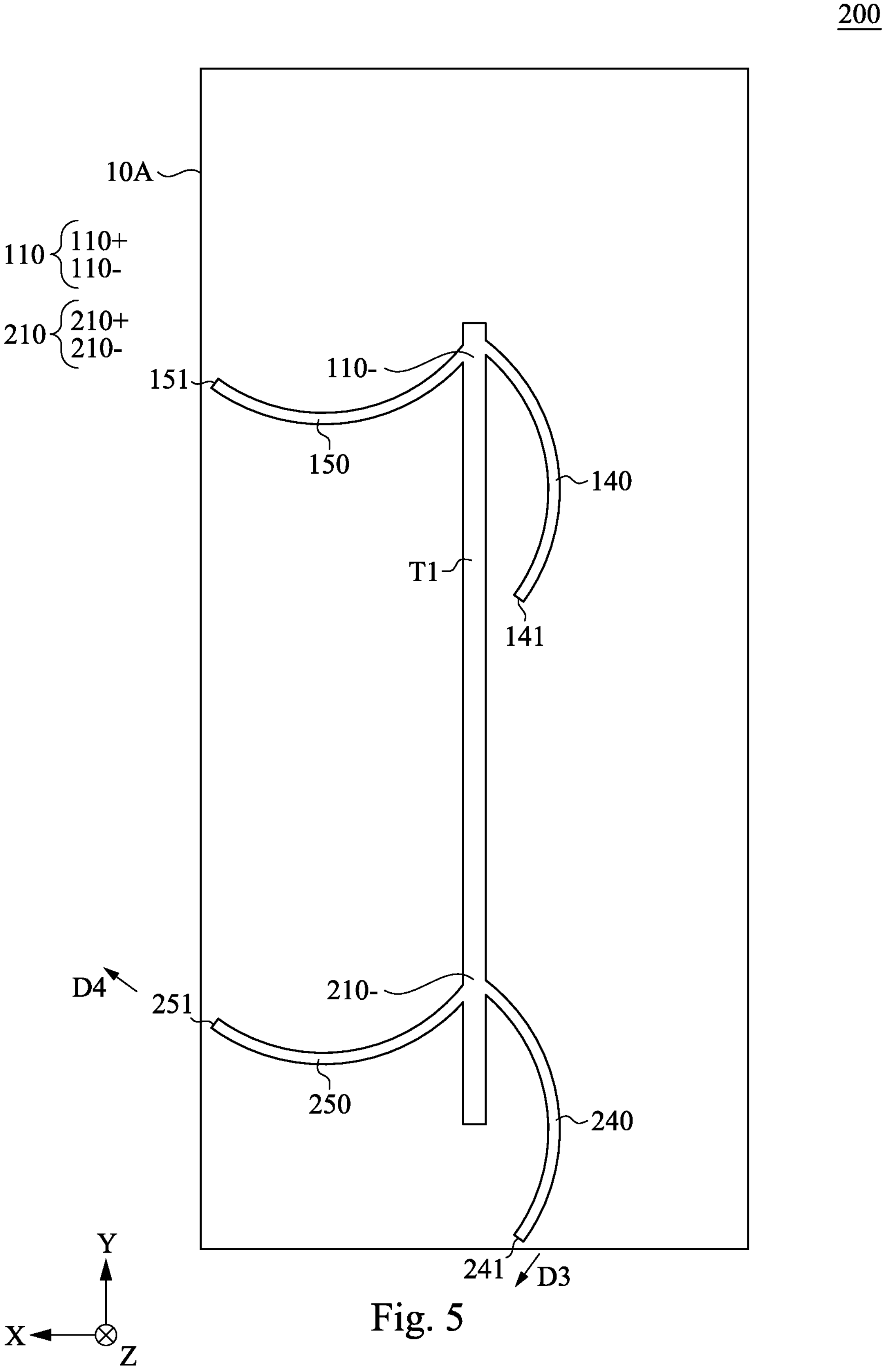
FIG. 5 is a structural diagram of a rear of a plurality of dual polarization antenna devices according to an embodiment of the present disclosure.

FIG. 3 is a structural diagram of a plurality of dual polarization antenna devices according to other embodiment of the present disclosure. As shown in the figure, the dual polarization antenna device 200 further includes a second input terminal 210, a transmitter T1, a fifth arc wire 220, a sixth arc wire 230, a seventh arc wire 240, and an eighth arc wire 250. In positional relationship, the fifth arc wire 220 and the sixth arc wire 230 are located at the front of the substrate 10A, and the seventh arc wire 240 and the eighth arc wire 250 are located at the rear of the substrate 10A. In connection relationship, transmitter T1 is connected through and coupled to the first input terminal 110 and the second input terminal 210, the fifth arc wire 220 is coupled to the second input terminal 210, the sixth arc wire 230 is coupled to the second input terminal 210, the seventh arc wire 240 is coupled to the second input terminal 210, and the eighth arc wire 250 is coupled to the second input terminal 210. In some embodiments, the second input terminal 210 includes the input terminal 210+ and the input terminal 210– (as shown in FIGS. 4 and 5). In connection relationship, the fifth arc wire 220 is coupled to the input terminal 210+, the sixth arc wire 230 is coupled to the input terminal 210+, the seventh arc wire 240 is coupled to the input terminal 210–, and the eighth arc wire 250 is coupled to the input terminal 210–, but the present disclosure is not limited to such embodiment.

In order to use the technology of dual polarization transmit and receive signals to improve the effectiveness of the signal transmit and receive area, the present disclosure provides the dual polarization antenna device 200 in FIG. 3, and the detailed operations of the dual polarization antenna device 200 is as shown below.

FIG. 4 is a structural diagram of a front of a plurality of dual polarization antenna devices according to an embodiment of the present disclosure. FIG. 5 is a structural diagram of a rear of a plurality of dual polarization antenna devices according to an embodiment of the present disclosure. Referring to FIG. 3 to FIG. 5, in one embodiment, the second input terminal 210 (such as the input terminal 210+, 210–) is configured to receive the input data signal. A fifth terminal 221 of the fifth arc wire 220 transmits and receives the output data signal along the first direction D1. A sixth terminal 231 of the sixth arc wire 230 transmits and receives the output data signal along the second direction D2, wherein the second input terminal 210 (such as the input terminal 210+) forms a fifth tangent line L5 along the fifth arc wire 220, the second input terminal 210 (such as the input terminal 210+) forms a sixth tangent line L6 along the sixth arc wire 230, and the fifth tangent line L5 and the sixth tangent line L6 intersect each other at the angle A1. A seventh terminal 241 of the seventh arc wire 240 transmits and receives the output data signal along the third direction D3. An eighth terminal 251 of the eighth arc wire 250 transmits and receives the output data signal along the fourth direction D4, the second input terminal 210 (such as the input terminal 210–) forms a seventh tangent line L7 along the seventh arc wire 240, the second input terminal 210 (such as the input terminal 210–) forms an eighth tangent line L8 along the eighth arc wire 250, and the seventh tangent line L7 and the eighth tangent line L8 intersect each other at the angle A1.

For example, a conversion relationship between the input signal and the output data signal through the fifth arc wire 220, the sixth arc wire 230, the seventh arc wire 240, or the eighth arc wire 250 can be similar to the conversion relationship between the input signal and the output data signal through the first arc wire 120 in FIG. 1, and thus it will be omitted herein for the sake of brevity. Moreover, the fifth tangent line L5 and the sixth tangent line L6 can intersect each other at the angle A1, the seventh tangent line L7 and the eighth tangent line L8 can intersect each other at the angle A1, and the angle A1 can be 90 degrees. The main purpose is to ensure that the polarization directions of the output data signal sent by the fifth arc wire 220, the sixth arc wire 230, the seventh arc wire 240, and the eighth arc wire 250 are vertical or horizontal to each other, so as to improve the transmit and receive area of the output data signal, but the present disclosure is not limited to such embodiment.

In an embodiment, the first arc wire 120 corresponds to the fifth arc wire 220, the second arc wire 130 corresponds to the sixth arc wire 230, the third arc wire 140 corresponds to the seventh arc wire 240, and the fourth arc wire 150 corresponds to the eighth arc wire 250, and the arc wires corresponding to each other (such as the first arc wire 120 and the fifth arc wire 220) can be used to transmit the output data signal in the same direction, but the present disclosure is not limited to such embodiment.

In an embodiment, the shape of the first arc wire 120, the shape of the second arc wire 130, the shape of the third arc wire 140, the shape of the fourth arc wire 150, a shape of the fifth arc wire 220, a shape of the sixth arc wire 230, a shape of the seventh arc wire 240, and a shape of the eighth arc wire 250 are the same. For example, the first arc wire 120, the second arc wire 130, the third arc wire 140, the fourth arc wire 150, the fifth arc wire 220, the sixth arc wire 230, the seventh arc wire 240, and the eighth arc wire 250 can have the same appearance or shape as each other, and the shape can generally refer to a one-dimensional, a two-dimensional, or a three-dimensional shape, but the present disclosure is not limited to such embodiment.

In an embodiment, the shape of the fifth arc wire 220, the shape of the sixth arc wire 230, the shape of the seventh arc wire 240, and the shape of the eighth arc wire 250 each include the quarter arc of the round. For example, the round can be a shape that follows an arc length equal to 2πr, the round can be divided into four quarter arc wire, and one of the four quarter arc wire can be used as the fifth arc wire 220, the sixth arc wire 230, the seventh arc wire 240, and the eighth arc wire 250. In other words, the fifth arc wire 220 can be the quarter arc wire, the sixth arc wire 230 can be the quarter arc wire, the seventh arc wire 240 can be the quarter arc wire, and the eighth arc wire 250 can be the quarter arc wire, but the present disclosure is not limited to such embodiment.

In an embodiment, a length of the quarter arc wire includes the quarter wavelength length of the output data signal. For example, a fifth length of the fifth arc wire 220, a sixth length of the sixth arc wire 230, a seventh length of the seventh arc wire 240, and an eighth length of the eighth arc wire 250 can be equal, and follow the above formula 1 and formula 2. Referring to the Table 1, the arc length in the Table 1 can be the fifth length, the sixth length, the seventh length, and the eighth length. The arc length can be 3.75, 1.5 or 3.125 cm, but the present disclosure is not limited to such embodiment.

Figure 6:
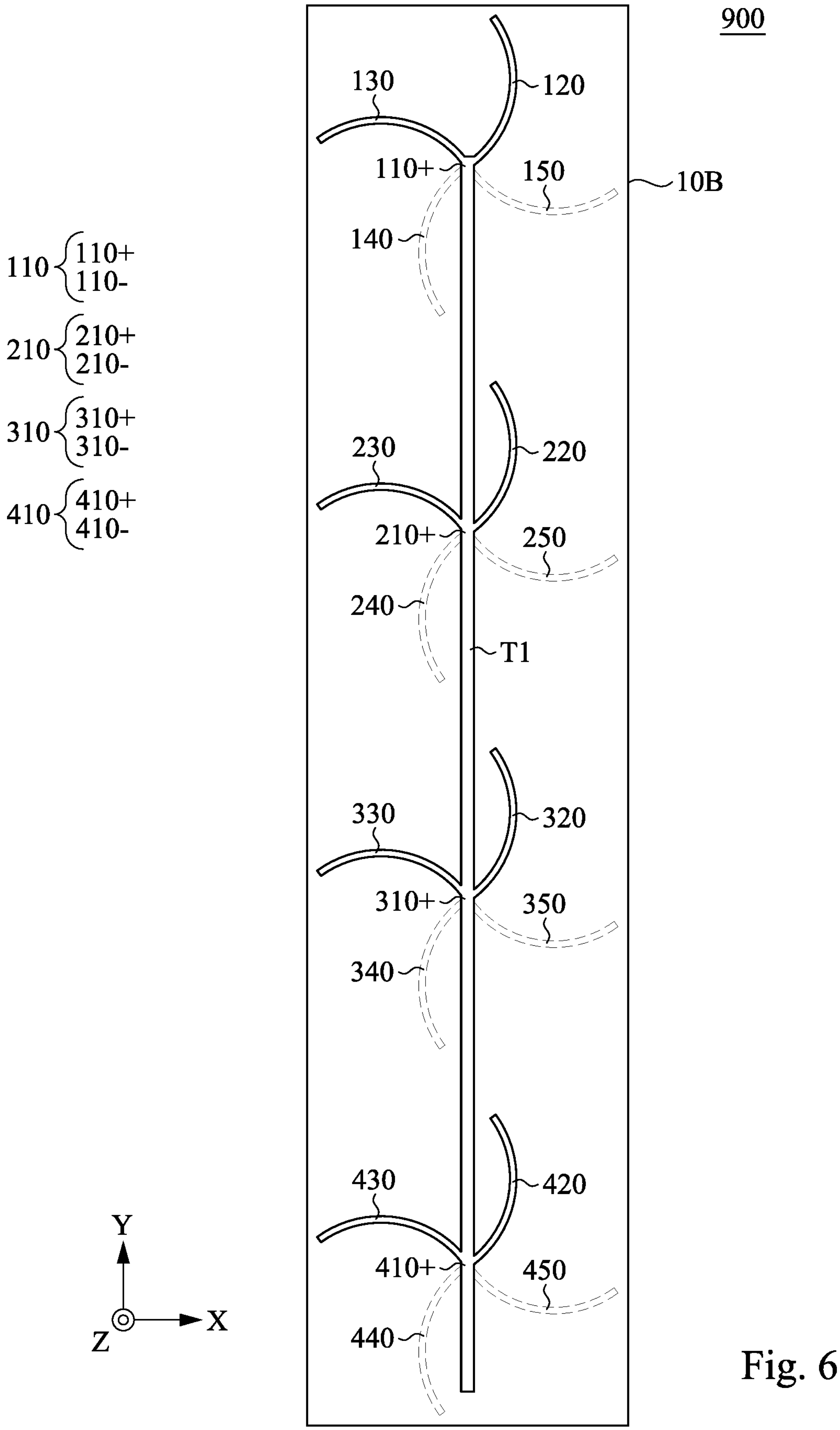
FIG. 6 is a structural diagram of a plurality of dual polarization antenna devices according to an embodiment of the present disclosure.

FIG. 6 is a structural diagram of a plurality of dual polarization antenna devices according to another embodiment of the present disclosure. As shown in the figure, the dual polarization antenna device 900 includes at least one of input terminal (such as the input terminal 110, 210, 310, and 410), at least one of first arc wire (such as the first arc wire 120, 220, 320, and 420), at least one of second arc wire (such as the second arc wire 130, 230, 330, and 430), at least one of third arc wire (such as the third arc wire 140, 240, 340, and 440), and at least one of fourth arc wire (such as the fourth arc wire 150, 250, 350, and 450). In positional relationship, the at least one of first arc wire (such as the first arc wire 120, 220, 320, and 420) and the at least one of second arc wire (such as the second arc wire 130, 230, 330, and 430) are located the front of the substrate 10B, the at least one of third arc wire (such as the third arc wire 140, 240, 340, and 440) and the at least one of fourth arc wire (such as the fourth arc wire 150, 250, 350, and 450) are located the rear of the substrate 10B. In connection relationship, the at least one of first arc wire (such as the first arc wire 120, 220, 320, and 420) is coupled to the at least one of input terminal (such as the input terminal 110+, 210+, 310+, and 410+), the at least one of second arc wire (such as the second arc wire 130, 230, 330, and 430) is coupled to the at least one of input terminal (such as the input terminal 110+, 210+, 310+, and 410+), the at least one of third arc wire (such as the third arc wire 140, 240, 340, and 440) is coupled to the at least one of input terminal (such as the input terminal 110−, 210−, 310−, and 410−), and the at least one of fourth arc wire (such as the fourth arc wire 150, 250, 350, and 450) is coupled to the at least one of input terminal (such as the input terminal 110−, 210−, 310−, and 410−).

In some embodiments, the at least one of input terminal 110 can have the input terminal 110+ and the input terminal 110−, the at least one of input terminal 210 can have the input terminal 210+ and the input terminal 210−, the at least one of input terminal 310 can have the input terminal 310+ and the input terminal 310−, and the at least one of input terminal 410 can have the input terminal 410+ and the input terminal 410−. In positional relationship, the input terminal 110+, 210+, 310+, and 410+ can be located at the front of the substrate 10B, the input terminal 110−, 210−, 310−, and 410− can be located at the rear of the substrate 10B, but the present disclosure is not limited to such embodiment.

It should be noted that the operation mode of the dual polarization antenna device 900 in FIG. 6 is similar to the operation mode of the dual polarization antenna device 100 in FIG. 1 and the dual polarization antenna device 200 in FIG. 3, and so it will be omitted herein for the sake of brevity.

It can be seen from the above embodiments that the present disclosure has the following advantages. The dual polarization antenna device shown in the embodiments of the present disclosure can use the technology of dual polarization transmit and receive signals to improve the effectiveness of the signal transmit and receive area.

Figure 7:
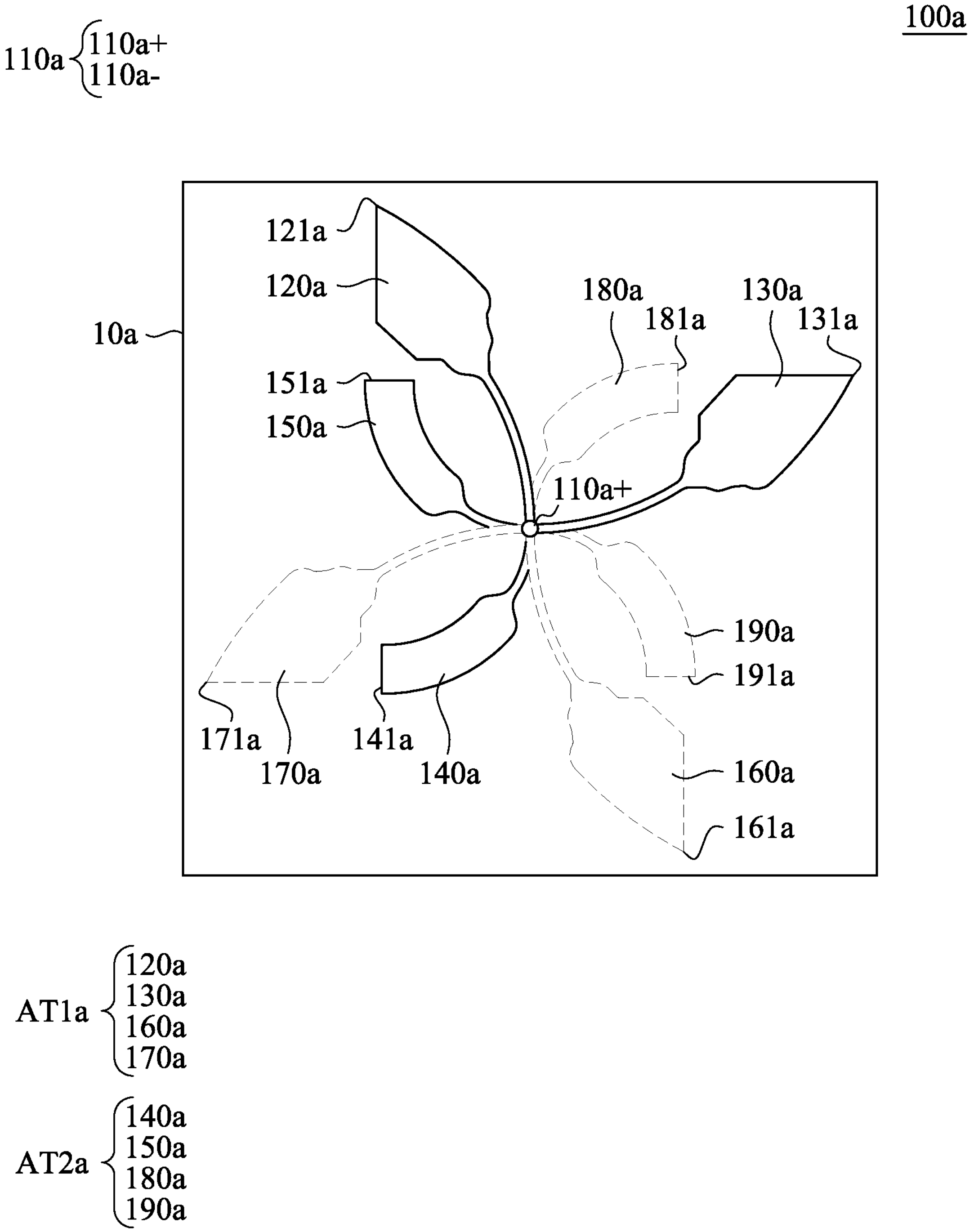
FIG. 7 is a structural diagram of a dual polarization antenna device according to an embodiment of the present disclosure.

FIG. 7 is a structural diagram of a dual polarization antenna device according to an embodiment of the present disclosure. As shown in the figure, the dual polarization antenna device 100*a* includes an input terminal 110*a*, a first antenna AT1*a*, and a second antenna AT2*a*. The first antenna AT1*a* includes a first sub antenna 120*a* and a second sub antenna 130*a*. The second antenna AT2*a* includes a third sub antenna 140*a* and a fourth sub antenna 150*a*. In positional relationship, the first sub antenna 120*a*, the second sub antenna 130*a*, the third sub antenna 140*a*, and the fourth sub antenna 150*a* are all located at the front of the substrate 10*a*.

In connection relationship, the first sub antenna 120*a* is coupled to the input terminal 110*a*, the second sub antenna 130*a* is coupled to the input terminal 110*a*, the third sub antenna 140*a* is coupled to the input terminal 110*a*, the fourth sub antenna 150*a* is coupled to the input terminal 110*a*. In some embodiments, the input terminal 110*a* can be composed of the input terminal 110*a*+ and the input terminal 110*a*−, in connection relationship, the first sub antenna 120*a* is coupled to the input terminal 110*a*+, the second sub antenna 130*a* is coupled to the input terminal 110*a*+, the third sub antenna 140*a* is coupled to the input terminal 110*a*+, the fourth sub antenna 150*a* is coupled to the input terminal 110*a*+, but the present disclosure is not limited to such embodiment.

In order to achieve the effect of outputting a plurality of output signals through a plurality of antenna structures, the present disclosure provides the dual polarization antenna device 100*a* in FIG. 7, and the detailed operations of the dual polarization antenna device 100*a* is as shown below.

Figure 8:
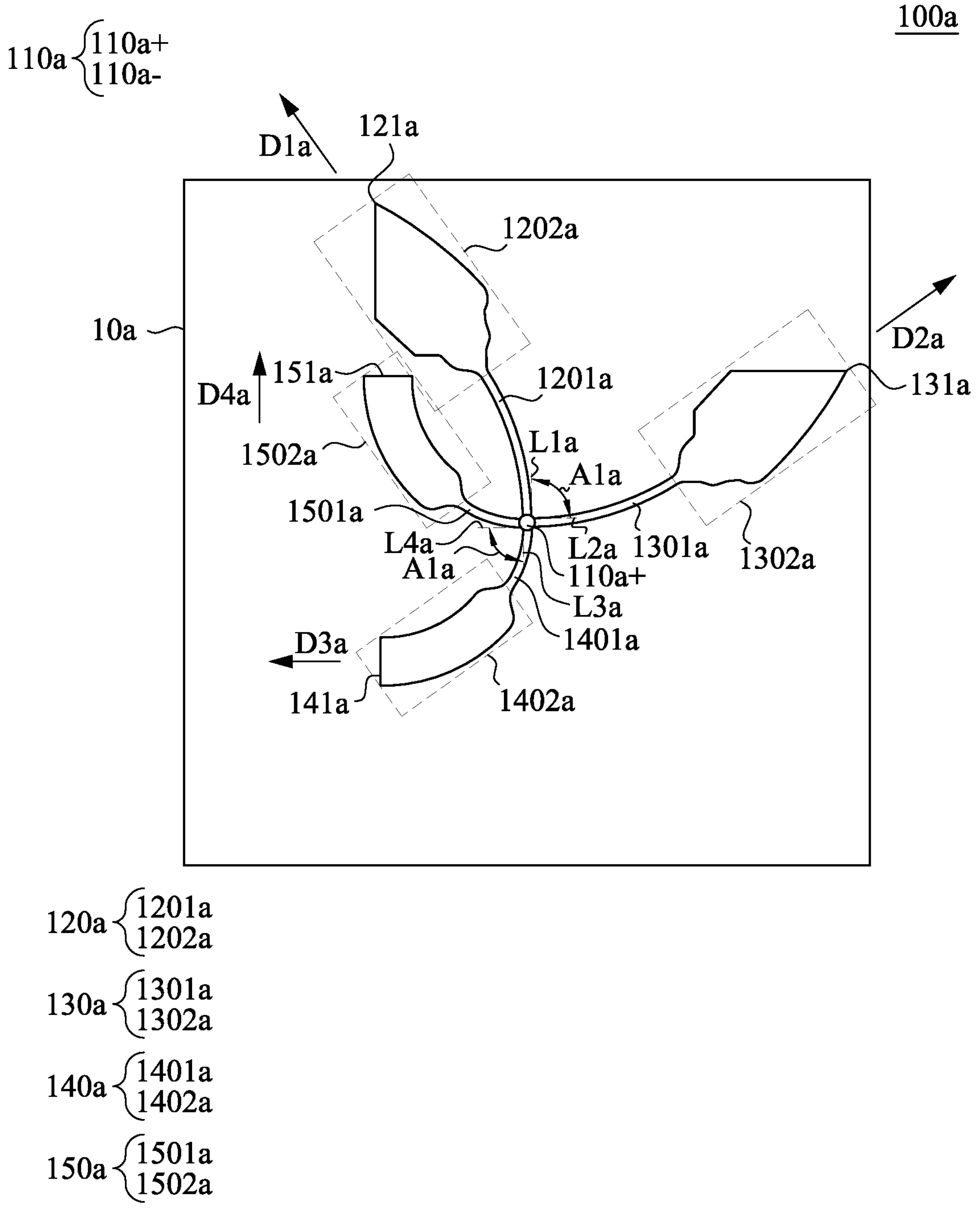
FIG. 8 is a structural diagram of a front of a dual polarization antenna device according to an embodiment of the present disclosure.

FIG. 8 is a structural diagram of a front of a dual polarization antenna device according to an embodiment of the present disclosure. Referring to FIG. 7 and FIG. 8, the input terminal 110*a* (such as the input terminal 110*a*+, 110*a*−) configured to receive a first input signal or a second input signal. A first terminal 121*a* of the first sub antenna 120*a* transmits and receives a first output signal along a first direction D1*a* according to the first input signal. For example, the first input signal can have a corresponding relationship with the first output signal, an input signal can be converted into an output signal through the first sub antenna 120*a*, and the first terminal 121*a* of the first sub antenna 120*a* transmits the first output signal along a first direction D1*a*. Besides, the first terminal 121*a* of first sub antenna 120*a* receives the first output signal along the first direction D1*a*, and the first output signal can be converted into the first input signal through the first sub antenna 120*a*, but the present disclosure is not limited to such embodiment.

A second terminal 131*a* of the second sub antenna 130*a* transmits and receives the first output signal along a second direction D2*a* according to the first input signal. A third terminal 141*a* of the third sub antenna 140*a* transmits and receives a second output signal along a third direction D3*a* according to the second input signal. A fourth terminal 151*a* of the fourth sub antenna 150*a* transmits and receives the second output signal along a fourth direction D4*a* according to the second input signal. The first direction D1*a* is perpendicular to the second direction D2*a*, and the third direction D3*a* is perpendicular to the fourth direction D4*a*.

For example, a conversion relationship between the first input signal and the first output signal through the second sub antenna 130*a* can be similar to the conversion relationship between the first input signal and the first output signal through the first sub antenna 120*a*. A conversion relationship between the second input signal and the second output signal through the third sub antenna 140*a* or the fourth sub antenna 150*a* can be similar to the conversion relationship between the second input signal and the second output signal through the first sub antenna 120*a*, and so it will be omitted herein for the sake of brevity.

Moreover, the first direction D1*a* can be perpendicular to the second direction D2*a*, and the third direction D3*a* can be perpendicular to the fourth direction D4*a*. The main purpose is to ensure that the polarization directions of the first output signal sent by the first sub antenna 120*a* and the second sub antenna 130*a* of the first antenna AT1*a* are vertical to each other. Similarly, it is ensured that in the second antenna AT2*a*, the polarization directions of the second output signals sent by the third sub antenna 140*a* and the fourth sub antenna 150*a* can be perpendicular to each other, so as to improve the transmit and receive area of the first output signal and the second output signal. The first direction D1*a*, the second direction D2*a*, the third direction D3*a*, and the fourth direction D4*a* can all be parallel to the substrate 10*a*, but the present disclosure is not limited to such embodiment.

In an embodiment, the first antenna AT1*a* does not overlap the second antenna AT2*a*. For example, when the first antenna AT1*a* and the second antenna AT2*a* is located at the front or the rear of the substrate 10*a*, the first sub antenna 120*a* and the second sub antenna 130*a* does not overlap the third sub antenna 140*a* and the fourth sub antenna 150*a*. Because the first antenna AT1*a* does not overlap with the second antenna AT2*a*, the first output signal sent by the first antenna AT1*a* and the second output signal sent by the second antenna AT2*a* will not affect each other, but the present disclosure is not limited to such embodiment.

In an embodiment, the first sub antenna length of the first sub antenna 120*a* and the second sub antenna length of the second sub antenna 130*a* are greater than the third sub antenna length of the third sub antenna 140*a* and the fourth sub antenna length of the fourth sub antenna 150*a*. For example, the first sub antenna length of the first sub antenna 120*a* can be defined as a length extending from the input terminal 110*a* (such as the input terminal 110*a*+) along the arc to the first terminal 121*a*. The second sub antenna length of the second sub antenna 130*a* can be defined as a length extending from the input terminal 110*a* (such as the input terminal 110*a*+) along the arc to the second terminal 131*a*. The third sub antenna length of the third sub antenna 140*a* can be defined as a length extending from the input terminal 110*a* (such as the input terminal 110*a*+) along the arc to the third terminal 141*a*. The fourth sub antenna length of the fourth sub antenna 150*a* can be defined as a length extending from the input terminal 110*a* (such as the input terminal 110*a*+) along the arc to the fourth terminal 151*a*, but the present disclosure is not limited to such embodiment.

Besides, the first antenna length of the first antenna AT1*a* can be either the length of the first sub antenna or the length of the second sub antenna, in other words, the first sub antenna length of the first sub antenna 120*a* is the same as the second sub antenna length of the second sub antenna 130*a*. Similarly, the second antenna length of the second antenna AT2*a* can be either the length of the third sub antenna or the length of the fourth sub antenna, in other words, the third sub antenna length of the third sub antenna 140*a* is the same as the fourth sub antenna length of the fourth sub antenna 150*a*, but the present disclosure is not limited to such embodiment.

Figure 9:
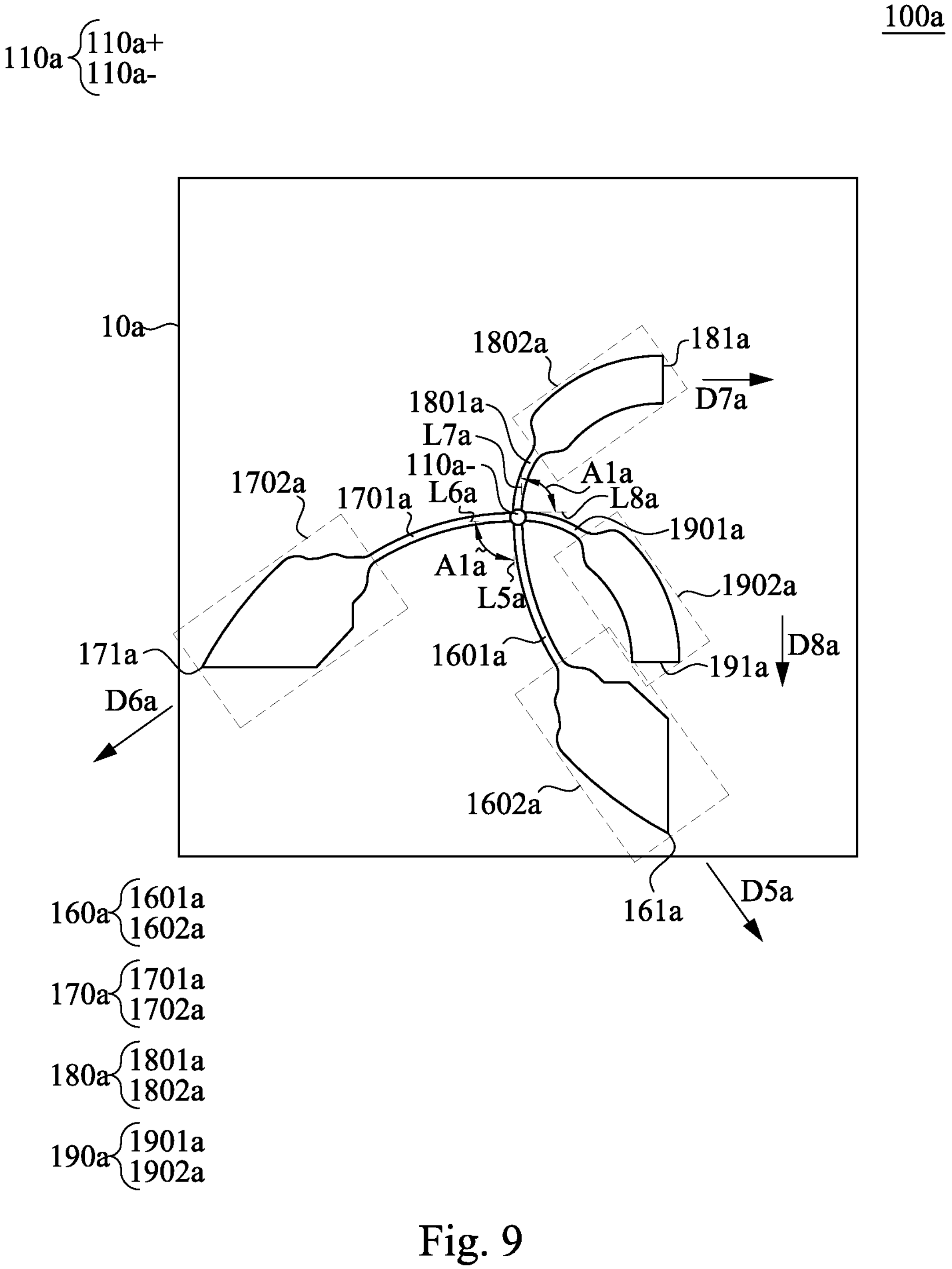
FIG. 9 is a structural diagram of a rear of a dual polarization antenna device according to an embodiment of the present disclosure.

FIG. 9 is a structural diagram of a rear of a dual polarization antenna device according to an embodiment of the present disclosure. As shown in the figure, the first antenna AT1*a* further includes a fifth sub antenna 160*a* and sixth sub antenna 170*a*. In positional relationship, the fifth sub antenna 160*a* and the sixth sub antenna 170*a* are located at the rear of the substrate 10*a*. In coupling relationship, the fifth sub antenna 160*a* is coupled to the input terminal 110*a* (such as the input terminal 110*a*−), and the sixth sub antenna 170*a* is coupled to the input terminal 110*a* (such as the input terminal 110*a*−).

In operation, in an embodiment, a fifth terminal 161*a* of the fifth sub antenna 160*a* transmits and receives the first output signal along a fifth direction D5*a* according to the first input signal. A sixth terminal 171*a* of the sixth sub antenna 170*a* transmits and receives the first output signal along a sixth direction D6*a* according to the first input signal. The fifth direction D5*a* is parallel to the first direction D1*a*, and the sixth direction D6*a* is parallel to the second direction D2*a*. For example, a conversion relationship between the first input signal and the first output signal through the fifth sub antenna 160*a* or the sixth sub antenna 170*a* can be similar to the conversion relationship between the first input signal and the first output signal through the first sub antenna 120*a*, and so it will be omitted herein for the sake of brevity.

Moreover, the fifth direction D5*a* can be parallel to the first direction D1*a*, and the sixth direction D6*a* can be parallel to the second direction D2*a*. In other words, the fifth direction D5*a* can be perpendicular to the sixth direction D6*a*. The main purpose is to ensure that the polarization directions of the first output signal sent by the fifth sub antenna 160*a* and the sixth sub antenna 170*a* of the first antenna AT1*a* can be perpendicular to each other, so as to improve the transmit and receive area of the first output signal. The fifth direction D5*a* and the sixth direction D6*a* can all be parallel to the substrate 10*a*, but the present disclosure is not limited to such embodiment.

Referring to FIG. 7 and FIG. 9, in an embodiment, the second antenna AT2*a* further includes a seventh sub antenna 180*a* and an eighth sub antenna 190*a*. In positional relationship, the seventh sub antenna 180*a* and the eighth sub antenna 190*a* are located at the rear of the substrate 10*a*. In coupling relationship, the seventh sub antenna 180*a* is coupled to the input terminal 110*a* (such as the input terminal 110*a*−), the eighth sub antenna 190*a* is coupled to the input terminal 110*a* (such as the input terminal 110*a*−).

In operation, in an embodiment, a seventh terminal 181*a* of the seventh sub antenna 180*a* transmits and receives the second output signal along a seventh direction D7*a* according to the second input signal. An eighth terminal 191*a* of the eighth sub antenna 190*a* transmits and receives the second output signal along an eighth direction D8*a* according to the second input signal. The seventh direction D7*a* is parallel to the third direction D3*a*, and the eighth direction D8*a* is parallel to the fourth direction D4*a*. For example, a conversion relationship between the second input signal and the second output signal through the seventh sub antenna 180*a* or the eighth sub antenna 190*a* can be similar to the conversion relationship between the first input signal and the first output signal through the first sub antenna 120*a*, and so it will be omitted herein for the sake of brevity.

Besides, the seventh direction D7*a* can be parallel to the third direction D3*a*, and the eighth direction D8*a* can be parallel to the fourth direction D4*a*. In other words, the seventh direction D7*a* can be perpendicular to the eighth direction D8*a*. The main purpose is to ensure that the polarization directions of the second output signal sent by the seventh sub antenna 180*a* and the eighth sub antenna 190*a* of the second antenna AT2*a* can be perpendicular to each other, so as to improve the transmit and receive area of the second output signal. The seventh direction D7*a* and the eighth direction D8*a* can all be parallel to the substrate 10*a*, but the present disclosure is not limited to such embodiment.

Referring to FIG. 7, in one embodiment, a first sub antenna length of the first sub antenna 120*a*, a second sub antenna length of a the second sub antenna 130*a*, a fifth sub antenna length of the fifth sub antenna 160*a*, and a sixth sub antenna length of the sixth sub antenna 170*a* are the same, and a third sub antenna length of the third sub antenna 140*a*, a fourth sub antenna length of the fourth sub antenna 150*a*, a seventh sub antenna length of the seventh sub antenna 180*a*, and an eighth sub antenna length of the eighth sub antenna 190*a* are the same. For example, in the first antenna AT1*a*, the first sub antenna length, the second sub antenna length, the fifth sub antenna length, and the sixth sub antenna length are the same. In the second antenna AT2*a*, the third sub antenna length, the fourth sub antenna length, the seventh sub antenna length, and the eighth sub antenna length are the same, and follow the following formula:

$$cl = \frac{1}{4}\lambda. \qquad \text{formula 1}$$

$$\lambda = \frac{c}{f}. \qquad \text{formula 2}$$

In the above formula 1, cl is the antenna length (cm), and λ is a wavelength (cm). In the above formula 2, λ is the wavelength (cm), c is a speed of light (m/s), f is a frequency (Hz).

A Table 2 can be obtained according to the above formula 1 and formula 2, as shown below.

TABLE 2

| | 2G antenna | 5G antenna | 2.4G antenna |
|---|---|---|---|
| the speed of light (m/s) | $3 \times 10^8$ | $3 \times 10^8$ | $3 \times 10^8$ |
| the frequency (Hz) | $2 \times 10^9$ | $5 \times 10^9$ | $2.4 \times 10^9$ |
| the wavelength (cm) | 15 | 6 | 12.5 |
| the antenna length (cm) | 3.75 | 1.5 | 3.125 |

Referring to the Table 2, for example, when the first output signal transmitted and received by the first antenna AT1*a* is 2G (Hz), the antenna length can be 3.75 (cm). Therefore, the first sub antenna length, the second sub antenna length, the fifth sub antenna length, and the sixth sub antenna length can be 3.75 (cm). Similarly, when the second output signal transmitted and received by the second antenna AT2*a* is 5G (Hz), the antenna length can be 1.5 (cm). Therefore, the third sub antenna length, the fourth sub antenna length, the seventh sub antenna length, and the eighth sub antenna length can be such as 1.5 (cm), but the present disclosure is not limited to such embodiment.

Referring to FIG. 8 and FIG. 9, in an embodiment, the first sub antenna 120*a* includes a first arc wire 1201*a* and a first transmit and receive component 1202*a*, and the first terminal 121*a* of the first transmit and receive component 1202*a* transmits and receives the first output signal along the first direction D1*a*. The second sub antenna 130*a* includes a second arc wire 1301*a* and a second transmit and receive component 1302*a*, and the second terminal 131*a* of the second transmit and receive component 1302*a* transmits and receives the first output signal along the second direction D2*a*. The third sub antenna 140*a* includes a third arc wire 1401*a* and a third transmit and receive component 1402*a*, and the third terminal 141*a* of the third transmit and receive component 1402*a* transmits and receives the second output signal along the third direction D3*a*. The fourth sub antenna 150*a* includes a fourth arc wire 1501*a* and a fourth transmit and receive component 1502*a*, and the fourth terminal 151*a* of the fourth transmit and receive component 1502*a* transmits and receives the second output signal along the fourth direction D4*a*.

For example, the first terminal 121*a* of the first transmit and receive component 1202*a* can be the first terminal 121*a* (as shown in FIG. 7) of the first sub antenna 120*a*, the second terminal 131*a* of the second transmit and receive component 1302*a* can be the second terminal 131*a* (as shown in FIG. 7) of the second sub antenna 130*a*, the third terminal 141*a* of the third transmit and receive component 1402*a* can be the third terminal 141*a* (as shown in FIG. 7) of the third sub antenna 140*a*, and the fourth terminal 151*a* of the fourth transmit and receive component 1502*a* can be the fourth terminal 151*a* (as shown in FIG. 7) of the fourth sub antenna 150*a*, but the present disclosure is not limited to such embodiment.

Referring to FIG. 8, in an embodiment, the input terminal 110*a* (such as the input terminal 110*a*+) forms a first tangent line L1*a* along the first arc wire 1201*a*, the input terminal 110*a* (such as the input terminal 110*a*+) forms a second tangent line L2*a* along the second arc wire 1301*a*, and the first tangent line L1*a* and the second tangent line L2*a* intersect each other at an angle A1*a*. The input terminal 110*a* (such as the input terminal 110*a*+) forms a third tangent line L3*a* along the third arc wire 1401*a*, the input terminal 110*a* (such as the input terminal 110*a*+) forms a fourth tangent line L4*a* along the fourth arc wire 1501*a*, and the third tangent line L3*a* and the fourth tangent line L4*a* intersect each other at the angle A1*a*. For example, the first tangent line L1*a* and the second tangent L2*a* can intersect each other at the angle A1*a*, the third tangent line L3*a* and the fourth tangent line L4*a* can intersect each other about at angle A1*a*, and the angle A1*a* can be 90 degrees. The main purpose is to ensure that the polarization directions of the first output signal sent by the first sub antenna 120*a* and the second sub antenna 130*a* of the first antenna AT1*a* can be perpendicular to each other. Similarly, it is ensured that in the second antenna AT2*a*, the polarization directions of the second output signal sent by the third sub antenna 140*a* and the fourth sub antenna 150*a* can be perpendicular to each other, so as to improve the transmit and receive area of the first output signal and the second output signal, but the present disclosure is not limited to such embodiment.

Referring to FIG. 9, the fifth sub antenna 160*a* includes a fifth arc wire 1601*a* and a fifth transmit and receive component 1602*a*, and the fifth terminal 161*a* of the fifth transmit and receive component 1602*a* transmits and receives the first output signal along the fifth direction D5*a*. The sixth sub antenna 170*a* includes a sixth arc wire 1701*a* and a sixth transmit and receive component 1702*a*, and the sixth terminal 171*a* of the sixth transmit and receive component 1702*a* transmits and receives the first output signal along the sixth direction D6*a*. The seventh sub antenna 180*a* includes a seventh arc wire 1801*a* and a seventh transmit and receive component 1802*a*, and the seventh terminal 181*a* of the seventh transmit and receive component 1802*a* transmits and receives the second output signal along the seventh direction D7*a*. The eighth sub antenna 190*a* includes an eighth arc wire 1901*a* and an eighth transmit and receive component 1902*a*, and the eighth terminal 191*a* of the eighth transmit and receive component 1902*a* transmits and receives the second output signal along the eighth direction D8*a*.

For example, the fifth terminal 161*a* of the fifth transmit and receive component 1602*a* can be the fifth terminal 161*a* (as shown in FIG. 7) of the fifth sub antenna 160*a*, the sixth terminal 171*a* of the sixth transmit and receive component 1702*a* can be the sixth terminal 171*a* (as shown in FIG. 7) of the sixth sub antenna 170*a*, the seventh terminal 181*a* of the seventh transmit and receive component 1802*a* can be the seventh terminal 181*a* (as shown in FIG. 7) of the seventh sub antenna 180*a*, and the eighth terminal 191*a* of the eighth transmit and receive component 1902*a* can be the eighth terminal 191*a* (as shown in FIG. 7) of the eighth sub antenna 190*a*, but the present disclosure is not limited to such embodiment.

In an embodiment, the input terminal 110*a* (such as the input terminal 110*a*−) forms a fifth tangent line L5*a* along the fifth arc wire 1601*a*, the input terminal 110*a* (such as the input terminal 110*a*−) forms a sixth tangent line L6*a* along the sixth arc wire 1701*a*, and the fifth tangent line L5*a* and the sixth tangent line L6*a* intersect each other at the angle A1*a*. The input terminal 110*a* (such as the input terminal 110*a*−) forms a seventh tangent line L7*a* along the seventh arc wire 1801*a*, the input terminal 110*a* (such as the input terminal 110*a*−) forms an eighth tangent line L8*a* along the eighth arc wire 1901*a*, and the seventh tangent line L7*a* and the eighth tangent line L8*a* intersect each other at the angle A1*a*. For example, the fifth tangent line L5*a* and the sixth tangent line L6*a* can intersect each other at the angle A1*a*, the seventh tangent line L7*a* and the eighth tangent line L8*a* can intersect each other at the angle A1*a*, and the angle A1*a* can be 90 degrees. The main purpose is to ensure that the polarization directions of the first output signal sent by the fifth sub antenna 160*a* and the sixth sub antenna 170*a* of the first antenna AT1*a* can be perpendicular to each other. Similarly, it is ensured that in the second antenna AT2*a*, the polarization directions of the second output signals sent by the seventh sub antenna 180*a* and the eighth sub antenna 190*a* can be perpendicular to each other, so as to improve the transmit and receive area of the first output signal and the second output signal, but the present disclosure is not limited to such embodiment.

In an embodiment, angle A1*a* includes the 90 degree angle. For example, the angle A1*a* can be 70, 80, or 90 degrees, but the present disclosure is not limited to the embodiment. In some embodiments, the angle A1*a* (that is, the best implementation angle) in the present disclosure can be 90 degrees, but the present disclosure is not limited to such embodiment.

Referring to FIG. 8 and FIG. 9, in an embodiment, the first sub antenna length of the first sub antenna 120*a* can be defined as a length extending from the input terminal 110*a* (such as the input terminal 110*a*+) along the first arc wire 1201*a* to the first terminal 121*a*. The second sub antenna length of the second sub antenna 130*a* can be defined as a length extending from the input terminal 110*a* (such as the input terminal 110*a*+) along the second arc wire 1301*a* to the second terminal 131*a*. The third sub antenna length of the third sub antenna 140*a* can be defined as a length extending from the input terminal 110*a* (such as the input terminal 110*a*+) along the third arc wire 1401*a* to the third terminal 141*a*. The fourth sub antenna length of the fourth sub antenna 150*a* can be defined as a length extending from the input terminal 110*a* (such as the input terminal 110*a*+) along the fourth arc wire 1501*a* to the fourth terminal 151*a*, but the present disclosure is not limited to such embodiment.

In an embodiment, the fifth sub antenna length of the fifth sub antenna 160*a* can be defined as a length extending from the input terminal 110*a* (such as the input terminal 110*a*−) along the fifth arc wire 1601*a* to the fifth terminal 161*a*. The sixth sub antenna length of the sixth sub antenna 170*a* can be defined as a length extending from the input terminal 110*a* (such as the input terminal 110*a*−) along the sixth arc wire 1701*a* to the sixth terminal 171*a*. The seventh sub antenna length of the seventh sub antenna 180*a* can be defined as a length extending from the input terminal 110*a* (such as the input terminal 110*a*−) along the seventh arc wire 1801*a* to the seventh terminal 181*a*. The eighth sub antenna length of the eighth sub antenna 190*a* can be defined as a length extending from the input terminal 110*a* (such as the input terminal 110*a*−) along the eighth arc wire 1901*a* to the eighth terminal 191*a*, but the present disclosure is not limited to such embodiment.

It can be seen from the above embodiments that the present disclosure has the following advantages. The dual polarization antenna device shown in the embodiment of the present disclosure can achieve the effect of outputting the plurality of output signals through the plurality of antenna structures.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A dual polarization antenna device, comprising:

a first input terminal, configured to receive an input data signal;

a first arc wire, located at a front of a substrate and coupled to the first input terminal, wherein a first terminal of the first arc wire transmits and receives an output data signal along a first direction;

a second arc wire, located at the front of the substrate and coupled to the first input terminal, wherein a second terminal of the second arc wire transmits and receives the output data signal along a second direction, wherein the first input terminal forms a first tangent line along the first arc wire, the first input terminal forms a second tangent line along the second arc wire, and the first tangent line and the second tangent line intersect each other at an angle;

a third arc wire, located at a rear of the substrate and coupled to the first input terminal, wherein a third terminal of the third arc wire transmits and receives the output data signal along a third direction; and a fourth arc wire, located at the rear of the substrate and coupled to the first input terminal, wherein a fourth terminal of the fourth arc wire transmits and receives the output data signal along a fourth direction, wherein the first input terminal forms a third tangent line along the third arc wire, the first input terminal forms a fourth tangent line along the fourth arc wire, and the third tangent line and the fourth tangent line intersect each other at the angle, wherein the first direction is parallel to the third direction, the second direction is parallel to the fourth direction, and the first direction is perpendicular to the second direction.

2. The dual polarization antenna device of claim 1, wherein a shape of the first arc wire, a shape of the second arc wire, a shape of the third arc wire, and a shape of the fourth arc wire are the same.

3. The dual polarization antenna device of claim 2, wherein the shape of the first arc wire, the shape of the second arc wire, the shape of the third arc wire, and the shape of the fourth arc wire each comprises a quarter arc wire of a round.

4. The dual polarization antenna device of claim 1, wherein a first length of the first arc wire, a second length of the second arc wire, a third length of the third arc wire, and a fourth length of the fourth arc wire are identical to each other.

5. The dual polarization antenna device of claim 4, wherein the first length of the first arc wire, the second length of the second arc wire, the third length of the third arc wire, and the fourth length of the fourth arc wire each comprises a quarter wavelength length of the output data signal.

6. The dual polarization antenna device of claim 1, wherein the angle comprises a 90 degree angle.

7. A dual polarization antenna device, comprising:

a first input terminal, configured to receive an input data signal;

a first arc wire, located at a front of a substrate and coupled to the first input terminal, wherein a first terminal of the first arc wire transmits and receives an output data signal along a first direction;

a second arc wire, located at the front of the substrate and coupled to the first input terminal, wherein a second terminal of the second arc wire transmits and receives the output data signal along a second direction, wherein the first input terminal forms a first tangent line along the first arc wire, the first input terminal forms a second tangent line along the second arc wire, and the first tangent line and the second tangent line intersect each other at an angle;

a third arc wire, located at a rear of the substrate and coupled to the first input terminal, wherein a third terminal of the third arc wire transmits and receives the output data signal along a third direction;

a fourth arc wire, located at the rear of the substrate and coupled to the first input terminal, wherein a fourth terminal of the fourth arc wire transmits and receives the output data signal along a fourth direction, wherein the first input terminal forms a third tangent line along the third arc wire, the first input terminal forms a fourth tangent line along the fourth arc wire, and the third tangent line and the fourth tangent line intersect each other at the angle, wherein the first direction is parallel to the third direction, the second direction is parallel to the fourth direction, and the first direction is perpendicular to the second direction;

a second input terminal, configured to receive the input data signal;

a transmitter, is connected through and coupled to the first input terminal and the second input terminal;

a fifth arc wire, located at the front of the substrate and coupled to the second input terminal, wherein a fifth terminal of the fifth arc wire transmits and receives the output data signal along the first direction;

a sixth arc wire, located at the front of the substrate and coupled to the second input terminal, wherein a sixth terminal of the sixth arc wire transmits and receives the output data signal along the second direction, wherein the second input terminal forms a fifth tangent line along the fifth arc wire, the second input terminal forms a sixth tangent line along the sixth arc wire, and the fifth tangent line and the sixth tangent line intersect each other at the angle;

a seventh arc wire, located at the rear of the substrate and coupled to the second input terminal, wherein a seventh terminal of the seventh arc wire transmits and receives the output data signal along the third direction; and an eighth arc wire, located at the rear of the substrate and coupled to the second input terminal, wherein an eighth terminal of the eighth arc wire transmits and receives the output data signal along the fourth direction, the second input terminal forms a seventh tangent line along the seventh arc wire, the second input terminal forms an eighth tangent line along the eighth arc wire, and the seventh tangent line and the eighth tangent line intersect each other at the angle.

8. The dual polarization antenna device of claim 7, wherein a shape of the first arc wire, a shape of the second arc wire, a shape of the third arc wire, a shape of the fourth arc wire, a shape of the fifth arc wire, a shape of the sixth arc wire, a shape of the seventh arc wire, and a shape of the eighth arc wire are identical to each other.

9. The dual polarization antenna device of claim 8, wherein the shape of the fifth arc wire, the shape of the sixth arc wire, the shape of the seventh arc wire, and the shape of the eighth arc wire each comprises a quarter arc wire of a round.

10. The dual polarization antenna device of claim 9, wherein a length of the quarter arc wire of the round comprises a quarter wavelength length of the output data signal.

11. A dual polarization antenna device, comprising:

an input terminal, configured to receive a first input signal and a second input signal;

a first antenna, comprising:

a first sub antenna, located at a front of a substrate and coupled to the input terminal, wherein a first terminal of the first sub antenna transmits and receives a first output signal along a first direction according to the first input signal;

a second sub antenna, located at the front of the substrate and coupled to the input terminal, wherein a second terminal of the second sub antenna transmits and receives the first output signal along a second direction according to the first input signal;

a second antenna, comprising:

a third sub antenna, located at the front of the substrate and coupled to the input terminal, wherein a third terminal of the third sub antenna transmits and receives a second output signal along a third direction according to the second input signal; and a fourth sub antenna, located at the front of the substrate and coupled to the input terminal, wherein a fourth terminal of the fourth sub antenna transmits and receives the second output signal along a fourth direction according to the second input signal, wherein the first direction is perpendicular to the second direction, and the third direction is perpendicular to the fourth direction.

12. The dual polarization antenna device of claim 11, wherein the first antenna does not overlap the second antenna.

13. The dual polarization antenna device of claim 11, wherein a first antenna length of one of the first sub antenna and the second sub antenna greater than a second antenna length of one of the third sub antenna and the fourth sub antenna.

14. The dual polarization antenna device of claim 13, wherein the first antenna further comprises:

a fifth sub antenna, located at a rear of the substrate and coupled to the input terminal, wherein a fifth terminal of the fifth sub antenna transmits and receives the first output signal along a fifth direction according to the first input signal; and a sixth sub antenna, located at the rear of the substrate and coupled to the input terminal, wherein a sixth terminal of the sixth sub antenna transmits and receives the first output signal along a sixth direction according to the first input signal, wherein the fifth direction is parallel to the first direction, and the sixth direction is parallel to the second direction.

15. The dual polarization antenna device of claim 14, wherein the second antenna further comprises:

a seventh sub antenna, located at the rear of the substrate and coupled to the input terminal, wherein a seventh terminal of the seventh sub antenna transmits and receives the second output signal along a seventh direction according to the second input signal; and an eighth sub antenna, located at the rear of the substrate and coupled to the input terminal, wherein an eighth terminal of the eighth sub antenna transmits and receives the second output signal along an eighth direction according to the second input signal, wherein the seventh direction is parallel to the third direction, and the eighth direction is parallel to the fourth direction.

16. The dual polarization antenna device of claim 15, wherein a first sub antenna length of the first sub antenna, a second sub antenna length of a the second sub antenna, a fifth sub antenna length of the fifth sub antenna, and a sixth sub antenna length of the sixth sub antenna are the same, and a third sub antenna length of the third sub antenna, a fourth sub antenna length of the fourth sub antenna, a seventh sub antenna length of the seventh sub antenna, and an eighth sub antenna length of the eighth sub antenna are the same.

17. The dual polarization antenna device of claim 15, wherein the first sub antenna comprises a first arc wire and a first transmit and receive component, and the first terminal of the first transmit and receive component transmits and receives the first output signal along the first direction, wherein the second sub antenna comprises a second arc wire and a second transmit and receive component, and the second terminal of the second transmit and receive component transmits and receives the first output signal along the second direction, wherein the third sub antenna comprises a third arc wire and a third transmit and receive component, and the third terminal of the third transmit and receive component transmits and receives the second output signal along the third direction, wherein the fourth sub antenna comprises a fourth arc wire and a fourth transmit and receive component, and the fourth terminal of the fourth transmit and receive component transmits and receives the second output signal along the fourth direction.

18. The dual polarization antenna device of claim 17, wherein the input terminal forms a first tangent line along the first arc wire, the input terminal forms a second tangent line along the second arc wire, and the first tangent line and the second tangent line intersect each other at an angle, wherein the input terminal forms a third tangent line along the third arc wire, the input terminal forms a fourth tangent line along the fourth arc wire, and the third tangent line and the fourth tangent line intersect each other at the angle.

19. The dual polarization antenna device of claim 15, wherein the fifth sub antenna comprises a fifth arc wire and a fifth transmit and receive component, and the fifth terminal of the fifth transmit and receive component transmits and receives the first output signal along the fifth direction, wherein the sixth sub antenna comprises a sixth arc wire and a sixth transmit and receive component, and the sixth terminal of the sixth transmit and receive component transmits and receives the first output signal along the second direction, wherein the seventh sub antenna comprises a seventh arc wire and a seventh transmit and receive component, and the seventh terminal of the seventh transmit and receive component transmits and receives the second output signal along the seventh direction, wherein the eighth sub antenna comprises an eighth arc wire and an eighth transmit and receive component, and the eighth terminal of the eighth transmit and receive component transmits and receives the second output signal along the eighth direction.

20. The dual polarization antenna device of claim 19, wherein the input terminal forms a fifth tangent line along the fifth arc wire, the input terminal forms a sixth tangent line along the sixth arc wire, and the fifth tangent line and the sixth tangent line intersect each other at an angle, wherein the input terminal forms a seventh tangent line along the seventh arc wire, the input terminal forms an eighth tangent line along the eighth arc wire, and the seventh tangent line and the eighth tangent line intersect each other at the angle.

* * * * *